May 28, 1929.  O. C. REEVES  1,714,623
WEIGHING SCALE
Filed May 31, 1924   3 Sheets-Sheet 1
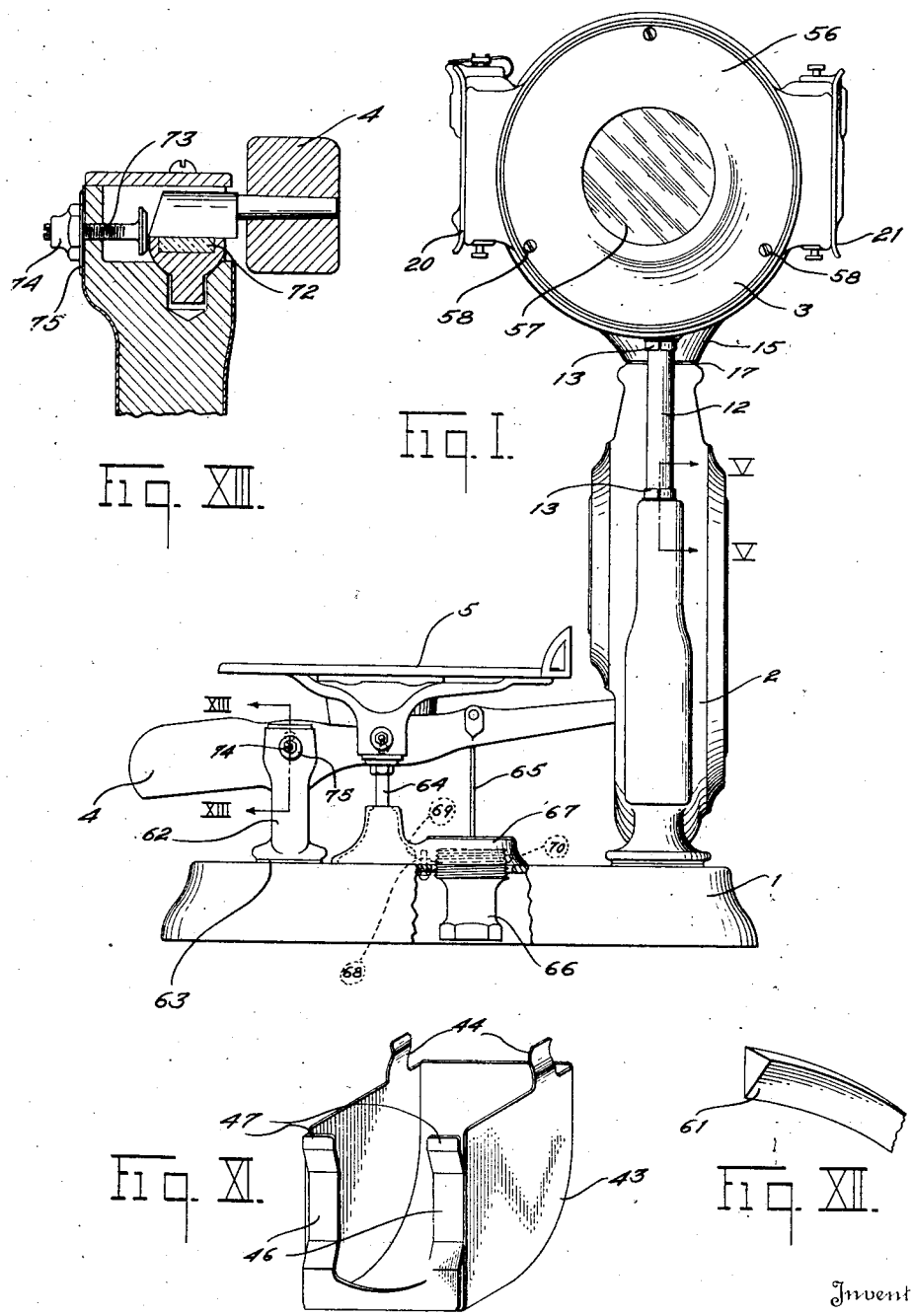
Inventor
Orwell C. Reeves.
By C. D. Marshall
Attorney

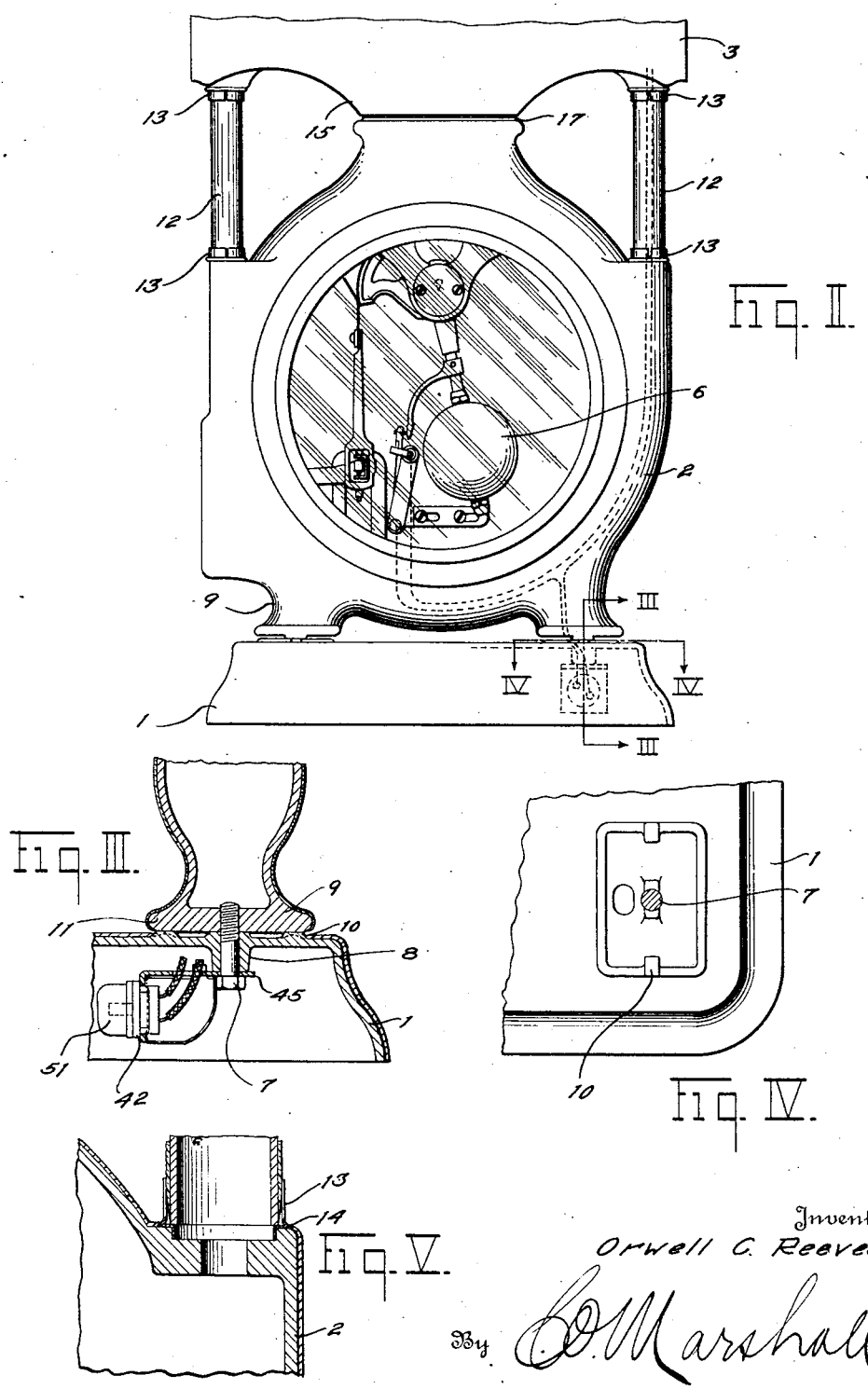

May 28, 1929.  O. C. REEVES  1,714,623
WEIGHING SCALE
Filed May 31, 1924   3 Sheets-Sheet 3
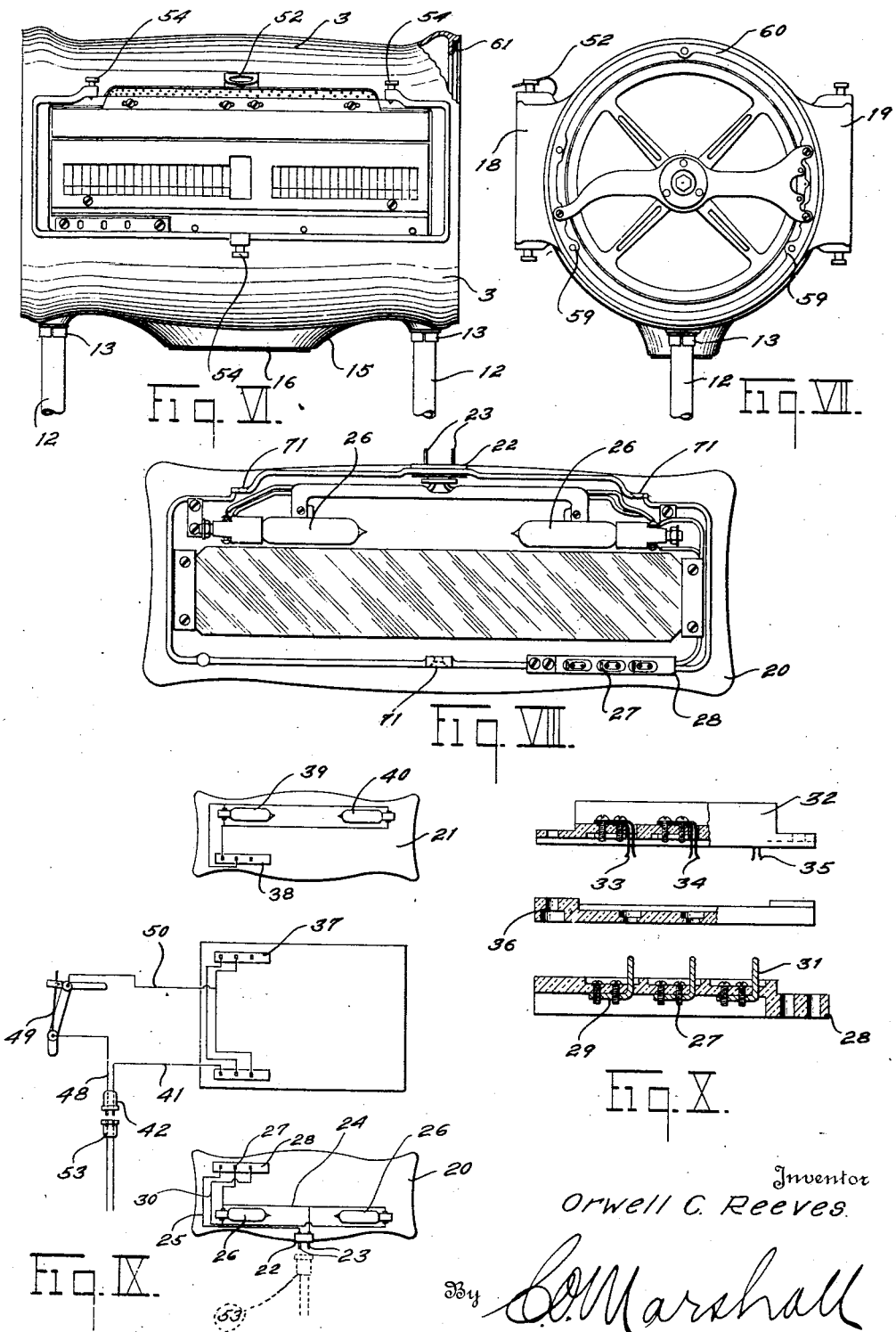
Inventor
Orwell C. Reeves
By C. N. Marshall
Attorney Patented May 28, 1929.

1,714,623

UNITED STATES PATENT OFFICE.

ORWELL C. REEVES, OF TOLEDO, OHIO, ASSIGNOR TO TOLEDO SCALE COMPANY, OF TOLEDO, OHIO, A CORPORATION OF NEW JERSEY.

WEIGHING SCALE.

Application filed May 31, 1924. Serial No. 717,033.

This invention relates to weighing scales, and particularly to scales of the so-called cylinder type, and one of its principal objects is to provide improved means for illuminating the indicator.

Another object is to render the illuminating means more accessible.

Another object is to facilitate the manufacturing and assembling operations in building scales of this type.

Another object is to improve the appearance of joints between various elements of the scale frame when such elements are finished in porcelain enamel or other vitreous coating.

Another object is to increase the sturdiness of scales of this type.

And still another object is to improve their appearance.

Other objects and advantages will be apparent from the following description, in which reference is had to the accompanying drawings illustrating a preferred embodiment of my invention and wherein similar reference numerals designate similar parts throughout the several views.

In the drawings:—

Figure I is a side elevation of a weighing scale of the cylinder type built in accordance with my invention;

Figure II is a fragmentary rear elevational view thereof;

Figure III is an enlarged fragmentary sectional view taken substantially on the line III—III of Figure II;

Figure IV is a sectional plan view taken substantially on the line IV—IV of Figure II;

Figure V is a still further enlarged fragmentary sectional rear elevational view taken substantially on the line V—V of Figure I;

Figure VI is a front elevational view showing the chart housing of the scale with the front scroll removed;

Figure VII is a side elevational view of the chart housing with the front, side and rear scrolls removed;

Figure VIII is a rear elevational view of the front scroll of the chart housing;

Figure IX is a wiring diagram;

Figure X is an enlarged detail view, partly in section, showing one of the wiring connections;

Figure XI is an enlarged perspective view of a bracket for supporting a plug for connecting the lighting circuits of a scale to a source of current;

Figure XII is a detail of a gasket used at one of the joints in the scale housing; and Figure XIII is an enlarged fragmentary sectional view taken substantially on the line XIII—XIII of Figure I.

Referring to the drawings, the base 1, upright housing 2, chart housing 3, lever 4, commodity-receiver 5 and load-counterbalancing pendulum 6 are of the same general construction as that illustrated and described in U. S. patent to Hapgood No. 1,166,128, patented December 28, 1915.

The framework, housings and the exposed working parts of the scale of the present invention are, however, intended to be finished in porcelain enamel or with other vitreous coating, and some of the features of this invention are particularly valuable when employed in scales so finished. The upright housing 2 is secured upon the rear end of the base 1 by means of cap screws 7 which pass upwardly through bosses 8 formed upon the lower side of the top of the base and are threaded into feet 9 on the upright housing 2. The portions of the base 1 and the feet 9 which are in engagement when the base and housing are assembled are provided with pads 10 which may be of any desired shape and which extend from the upper and lower surfaces of the base and foot respectively so that they may be readily machined off. The bottom of the foot 9 has an outwardly extending rounded edge 11 which projects beyond the pads 10 so that from the ordinary position of observation the joint between the base and the foot is concealed and only the rounded edge 11 and the adjacent portion of the base are visible. The rounded edge and the adjacent portion of the base are of such contour that they may be readily coated with porcelain enamel, and, as the pads which form the actual contacting portions of the housing and base project from the surfaces of the base and housing, the porcelain enamel may be readily wiped off from the pads before the base is fired and they may even be machined after the remainder of the part has been porcelain enameled.

Interposed between the upright housing 2 and the chart housing 3 are tubular members 12, one of which serves as a conduit for the electric wiring, while the other encases the intermediate portion of a rack bar which operates the indicating mechanism. These tubes are preferably also finished in porcelain enamel, and in order to provide an attractive joint between the tubes and the parts to which they are connected the connections are made by means of ferrules 13 which are preferably nickel plated. The ferrules 13 may, if desired, be split so that they resiliently clamp about the ends of the tubes and automatically conform to the size of the tubes even though there be slight variations in size and in the thickness of the porcelain enamel coating. The ferrules are provided with outwardly extending beads 14 which overlie the portions of the housing adjacent the openings in which the ends of the ferrules are inserted and thus, like the rounded edges 11 on the feet 9, serve to hide the joint and conceal such slight imperfections in the porcelain enamel coating as may occur around the opening.

In order to insure stability and provide against distortion in the chart housing which might otherwise result from turning up bolts and screws in assembling the chart housing and parts connected thereto, I construct the chart housing in the form of an integral casting. The indicating chart which is housed within the chart housing 3 is cylindrical in shape and the shape of the chart housing conforms generally to the shape of the chart but is so designed that its contour lines are flowing curves, thus adding to the beauty of the design and providing surfaces which porcelain enamel tends to coat uniformly and upon which non-uniformity of coating is not apparent.

The chart housing 3 is provided with a downwardly extending foot 15 which terminates in a pad 16 adapted to engage a similar pad 17 on the upper end of the upright housing 2. The contacting surfaces of the pads 16 and 17 are preferably free of enamel and may be machined either before or after the housings are porcelain enameled.

Projecting forwardly and rearwardly from the housing 3 are substantially rectangular window frames 18 and 19 which carry scrolls 20 and 21 that support the illuminating lamps and reading indices and which are provided with glazed openings through which the reading indices and the indicating chart are visible. The scroll 20 supports a current carrying plug 22, the points 23 of which project upwardly and are connected respectively to wires 24 and 25. The wire 24 leads to one side of each of a pair of lamps 26 which are mounted upon the inner side of the scroll 20 and thence to a connector point 27 secured on a connector block 28 which is also mounted on the scroll 20. The wire 25 leads to another connector point 29 also secured to the connector block 28. From the other side of each of the lamps 26 a wire 30 leads to a third connector point 31 which is secured to the connector block 28.

A jack block 32 is mounted in the chart housing 3 and is provided with three jacks 33, 34 and 35 which, when the scroll 20 is in place upon the housing 3, are engaged respectively by the connector points 29, 27 and 31. In order to protect the jacks 33, 34 and 35 the jack block 32 is provided with a cover 36. From the jacks 34 and 35 wires lead to corresponding jacks on a similar jack block 37 which is mounted upon the rear side of the housing 3 and co-operates with a connector block 38 that is mounted upon the rear scroll 31. The connector block 38 is wired, as shown in Figure IX, to a pair of lamps 39 and 40 mounted in the rear scroll.

From the jack 33 a wire 41 extends downwardly through one of the tubes 12 and the upright housing 2 to one of the points of a connector block 42 which is mounted by means of a bracket 43 on the lower side of the top of the base 1. The bracket 43 is preferably formed of resilient sheet metal and has a pair of ears 44 which may be sprung into engagement with a plate 45 secured by means of the cap screws 7 to the lower end of the boss 8. The connector block 42 is provided with a groove which when the plug is in place on the bracket receives a pair of resilient arms 46 and is thus held in place, the resilient arms 46 being provided with tips 47 which engage a downturned end on the plate 45 and thus form an additional holding means.

From the connector plug 42 a wire 48 extends to a switch 49 of the type described and claimed in U. S. patent to Wetzel No. 1,367,220, patented February 1, 1921. From the switch 49 a wire 50 extends to connection with the wire leading from the jack 35. It will thus be seen that the connector plug 22, the connector plug 42 and the switch 49 are in series. When the plug 22 is connected to a source of current the terminals or points 23 of the plug 42 are short circuited by means of a short circuiting plug or jumper plug. The lamps are thus illuminated whenever the switch 49 is automatically closed by movement of the weighing mechanism under load.

In order to prevent the scroll 20 from being removed from the scale while it is still connected to the source of current I have mounted a guard loop 52 upon the housing 2. This guard loop surrounds the plug 53 which is connected to the lighting circuit and the scroll cannot, therefore, be removed from the housing until the plug 53 is removed from the plug 22. When the scroll is removed from the housing the points 29, 27 and 31 are, of course, withdrawn from the jacks 33, 34 and 35 and when the scroll is replaced the points are re-inserted in the jacks.

In order to facilitate the removal and replacement of the scroll it is held in place on the housing by means of three cone pointed screws which are threaded through bosses on the casing and which engage the openings 71 in flanges on the scroll, the arrangement being such that as the points of the screws 54 are turned down into these openings the scroll is drawn tightly into place.

The sides of the chart housing 3 are closed by means of circular closures 56 which are preferably provided with windows 57 through which a portion of the indicator and its operating mechanism are visible. In order to provide a neat dust-proof joint between the closure 56 and the chart housing 3 the closure 56 is made of such size that it may be inserted in the opening in the side of the chart housing. The closure is held in place by means of screws 58 which are threaded into bosses 59 in an inwardly extending flange 60 adjacent the opening in the side of the chart housing. In order to prevent strains from being set up by a tightening of the bolts 59 and to eliminate chipping of the finish on the housing 3 and the closure 56, as well as to form a water-tight and dust-proof joint between the closure and the housing, a rubber gasket 61 of triangular cross section is inserted between the closure and the housing. Since the gasket lies against the flange 60 it is forced outwardly against the wall of the housing and more tightly against the flange 60 by tightening the screws 58.

The lever 4 is supported upon the base 1 by means of a fulcrum stand 62, the bottom of which is provided with a pad 63 similar to the pad 16 on the lower end of the foot 15.

The commodity-receiver 5 is connected by means of a spider stem 64 to a check link which is located under the base and is not shown, and the lever 4 is connected by means of a plunger rod 65 to a dash pot 66. In order to protect the spider stem 64 and give the portion of the base surrounding the openings through which the spider stem 64 and the plunger rod 65 pass a finished appearance, as well as to form a cover for and support for the dash pot 66, I have designed the member 67. This member is also designed to be finished in porcelain enamel. It is secured to the base 2 by means of a screw 68 extending from beneath the base into a boss 69 formed on the member 67. The upper end of the dash pot is threaded into a large internally threaded boss 70 so that when it is desired to re-fill the dash pot or remove it for any purpose it may be removed from beneath the base my merely unscrewing it.

It is desirable in scales which are to be finished in porcelain enamel that the number of screw heads and nuts on the exterior of the scale be reduced to a minimum, because the threading of the openings for such screws leaves the edges of the surrounding porcelain rough and unsightly. The porcelain may also be badly chipped if a nut be drawn down tightly upon it. To obviate such difficulties, I have provided the means illustrated in Figure XIII for concealing any unsightly or chipped places which may occur in the enamel surrounding the threaded openings. The pivots carried in the lever 4 are mounted in suitable bearings 72 supported in the upper extremities of the fulcrum stand. To prevent sidewise movement of the lever 4 the thrust screws 73 are threaded into the fulcrum stand and locked in proper position by means of the nuts 74. Interposed between these nuts and the fulcrum stand are thin metal washers 75 which cover up or conceal the rough edges of the porcelain enamel coating and present a neat finished appearance.

The embodiment of my invention herein shown and described is to be regarded as illustrative only, and it is to be understood that the invention is susceptible to variation, modification and change within the spirit and scope of the subjoined claims.

Having described my invention, I claim:

1. In a device of the class described, in combination, weighing mechanism, indicating mechanism operated by said weighing mechanism, a housing enclosing said indicating mechanism, said housing having a reading opening, a cover or scroll for said opening, said scroll having a window, and means carried by said scroll for illuminating said indicating mechanism.

2. In a device of the class described, in combination, weighing mechanism, indicating mechanism operated by said weighing mechanism, a housing enclosing said indicating mechanism, a reading opening in said housing, a cover or scroll for said opening, means carried by said scroll for illuminating said indicating mechanism, and means carried by said housing and said scroll for effecting a closing of the circuit for energizing said illuminating means when said scroll is placed over said opening.

3. In a weighing scale, in combination, weighing mechanism including an indicating chart, a housing surrounding said chart and having a window therein, a window scroll normally fixed to said housing, electric illuminating means, wiring for said illuminating means supported in said scroll, wiring in said housing, and means whereby said scroll and housing wiring are automatically connected when the scroll is fixed in position on said housing.

4. In a weighing scale, in combination, a housing having an opening, a scroll for said opening, means for securing said scroll to the housing, electric illuminating means carried by said scroll, wiring supported in said housing, wiring supported in said scroll and connected to said illuminating means, and means whereby said housing and scroll wiring is automatically connected in circuit when the scroll is fixed in place on said housing.

5. In a weighing scale, in combination, a housing having an opening, a scroll for said opening, means for securing the scroll to the housing, electric illuminating means carried by the scroll, wiring supported by said scroll, a connector block supported by said scroll and connected to said wiring, wiring supported in said housing, and a connector block supported by said housing adjacent said opening, said connector blocks being so positioned as to be brought into engagement when said scroll is placed in position on said housing.

6. In a weighing scale, in combination, weighing mechanism including an indicating chart, a housing surrounding said chart, said housing having an opening, a scroll normally fixed to said housing over said opening, wiring supported by said scroll and said housing, a current carrying plug supported on said scroll, means whereby said scroll and housing wiring are automatically connected when said scroll is placed in position on said housing, and means carried by said housing to prevent a removal of the scroll without first disconnecting a source of current from said current carrying plug.

7. In a weighing scale, in combination, an indicating chart, a housing surrounding said chart, said housing having an opening therein, a scroll normally fixed to said housing over said opening, wiring supported by said scroll and said housing, means whereby said scroll and said housing wiring are automatically connected when said scroll is placed in position on said housing, a current carrying plug, one of the members of which is mounted on said scroll, the other member being connected to a source of current, and a collar fixed to said housing and surrounding the last named plug member when it is connected to the member mounted on said scroll so that it is necessary to disconnect the plug members from each other before removing said scroll from said housing.

8. In a weighing scale, in combination, electric wiring supported by the scale frame, said wiring having positive and negative terminals at the top and at the bottom of said frame and a short circuiting plug adapted to be applied to either the top or bottom terminal when the other terminal is to be connected to a source of current, a clip for holding a current carrying plug in place and protecting the wiring connected thereto, consisting of a box-like member having spring fingers adapted to engage said plug and spring fingers adapted to engage the supporting frame.

ORWELL C. REEVES.